United States Patent [19]

Wood et al.

[11] Patent Number: 4,947,256

[45] Date of Patent: Aug. 7, 1990

[54] ADAPTIVE ARCHITECTURE FOR VIDEO EFFECTS

[75] Inventors: David G. S. Wood, Grass Valley; Mark Baldassari, Penn Valley, both of Calif.

[73] Assignee: The Grass Valley Group, Inc., Nevada City, Calif.

[21] Appl. No.: 344,189

[22] Filed: Apr. 26, 1989

[51] Int. Cl.⁵ .................... H04N 5/272; H04N 5/262; H04N 9/74

[52] U.S. Cl. .................................. 358/183; 358/22; 358/182; 340/721

[58] Field of Search ................ 358/22, 181, 182, 183; 340/721, 734

[56] References Cited

U.S. PATENT DOCUMENTS

| | | | |
|---|---|---|---|
| 4,667,221 | 5/1987 | Cawley et al. | 358/22 |
| 4,694,343 | 9/1987 | Flora | 358/183 |
| 4,694,344 | 9/1987 | Flora | 358/22 |
| 4,758,892 | 7/1988 | Bloomfield | 358/182 |
| 4,768,083 | 8/1988 | Romesburg | 358/22 |
| 4,782,392 | 11/1988 | Haycock et al. | 358/183 |
| 4,791,489 | 12/1988 | Polatnick | 358/22 |
| 4,831,447 | 5/1989 | Lake, Jr. | 358/22 |
| 4,853,784 | 8/1989 | Abt et al. | 358/183 |

Primary Examiner—John K. Peng
Attorney, Agent, or Firm—Francis I. Gray

[57] ABSTRACT

An adaptive architecture for video effects allows a transformed image from a digital video effects (DVE) system to be inserted at any desired point along a video path through a production switcher while maintaining strict timing reqirements between the digital video effects system and the production switcher. The transformed image from the DVE system is input to a primary input bus as well as to a fill video input of a dowstream keyer (DSK) for the production switcher. A key signal from the DVE system is input to an effects key input and a key input of the DSK for the production switcher. The DVE system has a genlock timing system that provides a variable output timing signal to synchronize the transformed image with the video of the production system at the desired point of insertion along the video path. The DVE system also has an output overlay mixer that passes the program video from the production switcher to the system output unless the insertion point is at the output of the production switcher, at which point the transformed video is overlaid on the program output. The desired insertion point is determined by a topology mode indicator included within the keyframes that are programmed to produce a desired video effect.

5 Claims, 1 Drawing Sheet

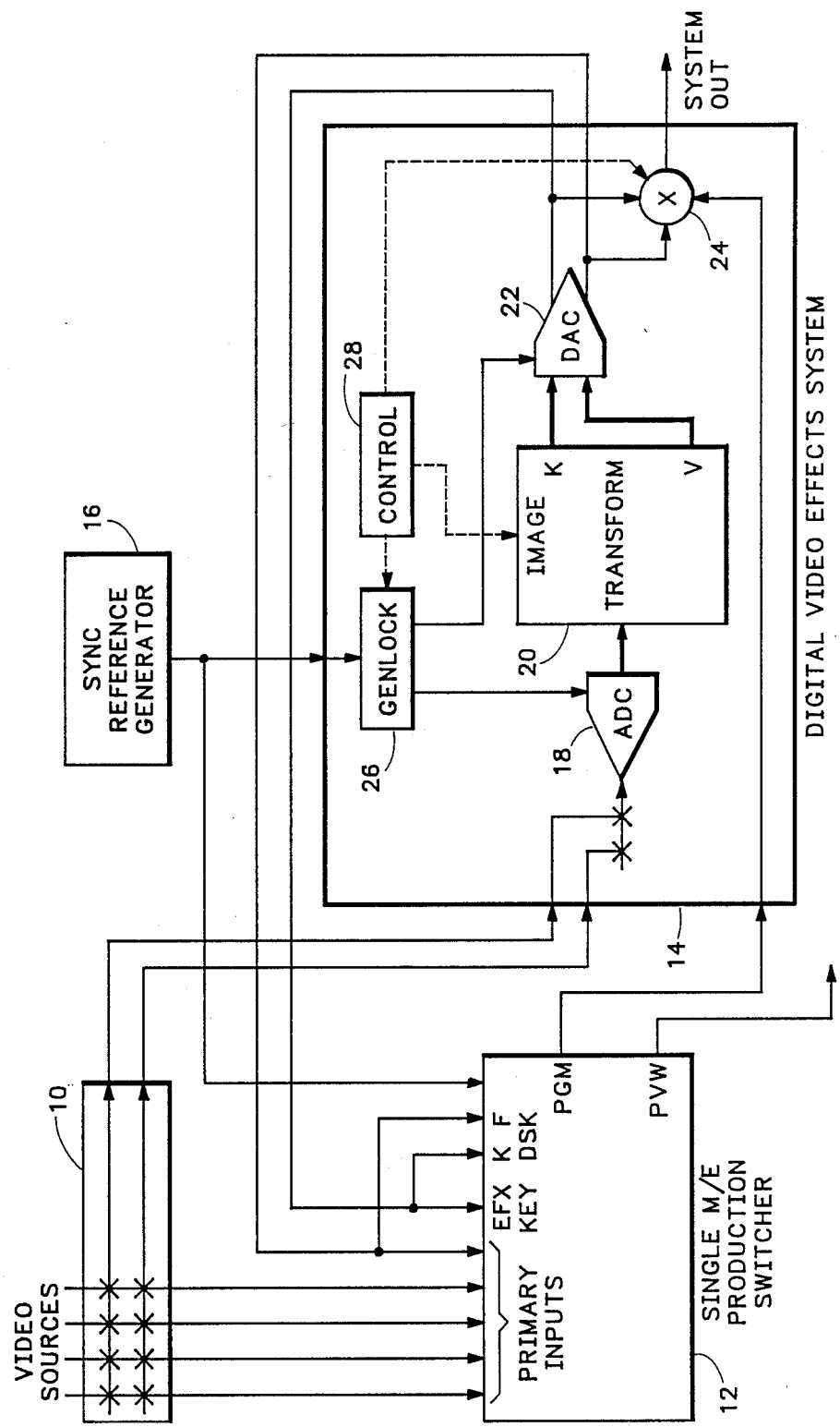

ADAPTIVE ARCHITECTURE FOR VIDEO EFFECTS

BACKGROUND OF THE INVENTION

The present invention relates to the creation of digital video effects, and more particularly to an adaptive architecture for video effects that allows a digital video effects (DVE) system to be inserted into multiple points of a video path of a production switcher.

Digital video effects systems have been used together with post production switchers for many years. When used together these two devices can perform complex visual effects. The DVE system is used to enhance the visual effect capability of the production switcher by allowing an image to be spatially transformed, such as by an increase/decrease in size, a change in on-screen location, rotation, perspective change, etc. The production switcher then is used to combine the transformed image with other video signals. This allows such effects as flying a compressed image over a background image, shrinking an on-screen picture to a vanishing point to reveal another image underneath it, compressing and re-positioning a graphic to fit it properly with other visual elements of the picture, and many more.

Historically system timing requirements have meant that the production switcher and DVE system could only be connected in a single, fixed topology, since in order for these two devices to work together effectively very strict timing requirements must be met. If the production switcher combines images that do not meet these timing requirements, unacceptable shifts in on-screen position and color hue destroy the illusion that the visual effect was meant to create. Achieving a particular topology often includes the use of external delay lines and careful alignment of timing adjustments on the DVE system to meet the timing requirements. Some topologies are easier to achieve than others. Often the choice of a particular topology is forced on the system designer by the characteristics of the equipment used and the general system layout of the studio.

The unfortunate result of operating with a single, fixed topology is that some visual effects are easy to obtain, while others are very difficult. The fixed topology means that the transformed image from the DVE system can only appear in certain layers of the composite effect that the production switcher is producing. With large production switchers having two or more mix effects banks that are capable of seven or more simultaneous layers of video in the composite effect, this limitation is generally not cumbersome since the DVE system may be made to appear on intermediate layers, leaving the operator freedom of choice in using the remaining layers that are above or below the DVE system layer in priority. On smaller, single mix effects switchers, which may provide only two or three layers, a fixed topology leaves no flexibility whatsoever. Many visual effects, even though they require only two layers, cannot be achieved in a single pass. Instead they require multiple passes using videotape machines to replay into an upstream layer a portion of the effect that was produced using different layers on a previous pass. These operations are time-consuming and degrade image quality.

What is desired is a flexible topology for the combination of a DVE system with a production switcher, particularly a single mix effects production switcher, so that a transformed image may be inserted into several points of the video path through the production switcher to achieve previously difficult to obtain visual effects.

SUMMARY OF THE INVENTION

Accordingly the present invention provides an adaptive architecture for video effects that allows for the insertion of a transformed image from a digital video effects system at different points of the video processing path through a production switcher. The video output from the DVE system is inserted into both the primary video input bus of the production switcher and the fill input of a downstream keyer (DSK). The key output from the DVE system is inserted into both an effects key input channel of the production switcher and the key input of the DSK. Finally the DVE system includes an overlay mixer to mix the transformed image with the program output of the production switcher. A variable genlock system within the DVE system provides variable timing signals according to the point of insertion for the transformed image into the production switcher video path to assure proper timing between the DVE system and the production switcher. Thus the transformed image from the DVE system may be inserted as a background, an effects over a background, a fill video or an overlaid video over the output from the production switcher.

The objects, advantages and novel features of the present invention are apparent from the following detailed description when read in conjunction with the appended claims and attached drawing.

BRIEF DESCRIPTION OF THE DRAWING

The FIGURE is a block diagram of an adaptive architecture for video effects according to the present invention.

DESCRIPTION OF THE PREFERRED EMBODIMENT

Referring now to the FIGURE a plurality of video sources are input to a cross-point switching matrix 10 and to a primary input bus for a production switcher 12. Two outputs from the cross-point switching matrix 10 provide inputs to a video input bus for a digital video effects (DVE) system 14. A sync reference generator 16 provides a single timing reference for both the production switcher 12 and the DVE system 14. The video selected from the input bus of the DVE system is input to an analog to digital converter (ADC) 18, and the output of the ADC is input to an image transform system 20 to perform a desired transformation of the selected input video. The output of the image transform system 20 is a transformed video and a key signal. The transformed video and key are input to a digital to analog converter (DAC) 22 and then to the production switcher 12. The transformed video is input to the primary input bus of the production switcher 12 as well as to a fill video input for a downstream keyer (DSK) of the production switcher. The key is input to an effects key input of the production switcher 12 as well as to a key input for the DSK. The program output of the production switcher 12 is input to an overlay mixer 24 in the DVE system 14, and a system output video is taken from the overlay mixer. Also input to the overlay mixer 24 are the transformed video and key of the DVE system 14.

Timing of the DVE system 14 to properly coincide with the production switcher 12 is achieved by a genlock timing system 26 within the DVE system. The genlock timing system 26 has two timing signal outputs, one for the ADC 18 and the other for the DAC 22. The timing signal outputs are variable and set up at the time of system installation. The timing of the DVE system 14 with respect to the production switcher 12 is determined by the second output from the genlock timing system 26 to the DAC 22. The combination shown in the FIGURE provides four different modes of operation for insertion of the transformed video into the production switcher video path. The genlock timing system 26 is set up with four different timing signals for the DAC 22 according to which insertion point is selected for the transformed video. When a particular insertion point is selected by the operator, a controller 28 within the DVE system 14 selects the appropriate output timing signal from the genlock timing system 26 for the DAC 22. This timing mechanism allows the DVE system 14 to adjust its own pathlength and time position to accomodate the timing requirements necessary for a particular topology defined by the desired insertion point.

There are four insertion points for the configuration shown in the FIGURE. First the transformed image may be inserted at the primary input bus of the production switcher 12 so that it becomes the background video for the resulting effect, the key being free to add an additional layer. Second the transformed image may be inserted as a layer just above the background video when the key is used in the effects keyer to superimpose the transformed video over a background video from the primary input bus. Third the transformed video and key may be used in the DSK to provide a fill over the background video and the effects keyed video. Finally the transformed image may be overlaid over the program output from the production switcher 12 by the overlay mixer 24.

To illustrate the operation of this flexible topology, a desired effect is to have a first video signal appear over a background video signal from the left of the screen with a graphics over the first video signal. The first video signal then is moved up to the right and then back to the center while increasing in size to overlay the graphics. To program such a visual effect a keyframe programming technique is used that identifies significant points, or keyframes, along the path of movement of the first video signal. Each keyframe defines a position for the first video signal, a size, a path definition for movement and the like. Also included in each keyframe is a topology mode indicator for the DVE system 14. For the effect described there may be four keyframes. The first keyframe is off-screen to the left to define initial parameters. The second keyframe is at the center of the screen with the graphics over the first video signal. The third keyframe is at the upper right of the screen removed from under the graphics. Finally the fourth keyframe is back at the center of the screen overlaying the graphics with the first video signal being expanded. The visual effect created is that of the first video signal coming from a distance behind the graphics until it reaches a near point in front of the graphics, i.e., the first video signal "orbits" the graphics layer.

For the first two keyframes the topology mode is that of an effects keyer so that the transformed image is in a video layer over the background video but under a graphics layer produced by a character generator providing input to the DSK. At keyframe three the topology mode indicator is changed to an overlay mode so that for the movement between keyframes three and four the transformed image is mixed with the program output of the production switcher 12 in the overlay mixer 24 of the DVE system 14 to appear as the top video layer. The required timing change for the output timing signal of the genlock timing system 26 occurs instantaneously during a vertical interval. Although the production switcher 12 in the FIGURE is shown as a single mix effects (M/E) switcher, this flexible topology may also be used with multiple M/E switchers to provide even greater flexibility and more complex visual effects than previously attainable.

Thus the present invention provides an adaptive architecture for video effects that allows for the insertion of a transformed image from a DVE system into several points of a video path through a production switcher while maintaining strict timing requirements for each insertion point. The timing requirements are established by a genlock timing system that has a variable output timing signal to sync the transformed image with the production switcher video according to the selected insertion point.

What is claimed is:

1. An adaptive architecture for video effects comprises:
    a production switcher for combining a plurality of video input signals as a function of key input signals to produce a composited video signal having the combined video input signals in layers, the layering of the video input signals in the composited video signal being a function of the point along a video path through the production switcher at which the video input signals are combined;
    a video effects system for transforming one of the plurality of video input signals to produce a transformed video signal, the transformed video signal being inserted into the video path for combination with other video input signals at a point that is a function of the desired layer within the composited video signal at which the transformed video signal is to appear; and
    means for varying the timing for the transformed video signal so that the transformed video signal is synchronized with a video signal in the video path at the point where the transformed video signal is inserted into the video path.

2. An adaptive architecture as recited in claim 1 further comprises means for variably selecting the point at which the transformed video signal is inserted into the video path.

3. An adaptive architecture as recited in claim 2 wherein the selecting means comprises means for controlling the point on a keyframe by keyframe basis.

4. An adaptive architecture as recited in claim 1 wherein the video effects system comprises:
    means for digitizing the one video input signal;
    means for transforming the digitized one video input signal into a digitized transformed video signal; and
    means for converting the digitized transformed video signal into the transformed video signal having a time delay with respect to a reference video signal that is determined by a variable timing signal from the varying means.

5. An adaptive architecture as recited in claim 4 wherein the video effects system further comprises means for overlaying the transformed video signal onto the composited video signal to produce a system output video signal.

* * * * *